(12) United States Patent
Van Thiel

(10) Patent No.: US 10,946,848 B2
(45) Date of Patent: Mar. 16, 2021

(54) ELECTROPNEUMATIC PARKING BRAKE MODULE FOR UTILITY VEHICLES WITH SPRING-TYPE PARKING BRAKES

(71) Applicant: WABCO GmbH, Hannover (DE)

(72) Inventor: Julian Van Thiel, Burgwedel (DE)

(73) Assignee: WABCO GMBH, Hannover (DE)

(*) Notice: Subject to any disclaimer, the term of this patent is extended or adjusted under 35 U.S.C. 154(b) by 0 days.

(21) Appl. No.: 16/754,753

(22) PCT Filed: Aug. 30, 2018

(86) PCT No.: PCT/EP2018/073379
§ 371 (c)(1),
(2) Date: Apr. 9, 2020

(87) PCT Pub. No.: WO2019/072452
PCT Pub. Date: Apr. 18, 2019

(65) Prior Publication Data
US 2020/0307537 A1 Oct. 1, 2020

(30) Foreign Application Priority Data

Oct. 14, 2017 (DE) ...................... 10 2017 009 578.7

(51) Int. Cl.
*B60T 13/26* (2006.01)
*B60T 7/20* (2006.01)
(Continued)

(52) U.S. Cl.
CPC ............. *B60T 13/263* (2013.01); *B60T 7/20* (2013.01); *B60T 13/385* (2013.01); *B60T 13/683* (2013.01); *B60T 17/221* (2013.01)

(58) Field of Classification Search
CPC ........ B60T 13/263; B60T 7/20; B60T 17/221; B60T 13/683; B60T 13/385
See application file for complete search history.

(56) References Cited

U.S. PATENT DOCUMENTS 5,848,826 A * 12/1998 Muller ...................... B60T 7/20
303/22.4
7,832,813 B2 * 11/2010 Bensch ................. B60T 13/683
303/15

(Continued)

FOREIGN PATENT DOCUMENTS

DE      10336611 A1    3/2005
DE   102006041011 A1    3/2008

(Continued)

*Primary Examiner* — Pamela Rodriguez
(74) *Attorney, Agent, or Firm* — Leydig, Voit & Mayer, Ltd.

(57) ABSTRACT

An electropneumatic parking brake module includes a supply port configured to connect a compressed air supply, a spring brake actuator port configured to connect at least one spring brake cylinder, and a trailer control port, an inlet-outlet valve unit configured to control a spring brake pressure, and an electropneumatic pilot control unit configured to control at least one control pressure at the inlet-outlet valve unit and configured to perform a trailer control position function. The electropneumatic pilot control unit includes a 3/3-way valve that has a first switching position in which the at least one control pressure is controlled, a second switching position in which the trailer control position function is carried out, and a third switching position in which the inlet-outlet valve unit and the trailer control port are connected to a vent.

15 Claims, 2 Drawing Sheets

(51) Int. Cl.
    *B60T 13/38*     (2006.01)
    *B60T 13/68*     (2006.01)
    *B60T 17/22*     (2006.01)

(56)     References Cited

U.S. PATENT DOCUMENTS

| | | | |
|---|---|---|---|
| 8,282,173 B2 * | 10/2012 | Forster | B60T 13/263 |
| | | | 303/7 |
| 9,573,577 B2 * | 2/2017 | Hilberer | B60T 17/04 |
| 9,694,801 B2 * | 7/2017 | Frank | B60T 17/02 |
| 2005/0029859 A1 | 2/2005 | Bensch | |
| 2009/0309413 A1 * | 12/2009 | Bensch | B60T 17/04 |
| | | | 303/20 |
| 2010/0025141 A1 * | 2/2010 | Bensch | B60T 8/327 |
| | | | 180/271 |
| 2010/0078988 A1 | 4/2010 | Bensch | |
| 2010/0187902 A1 | 7/2010 | Bensch | |
| 2020/0172073 A1 * | 6/2020 | Wieder | B60T 13/26 |
| 2020/0189550 A1 * | 6/2020 | van Thiel | B60T 13/68 |
| 2020/0207319 A1 * | 7/2020 | Van Thiel | B60T 13/74 |

FOREIGN PATENT DOCUMENTS

| | | |
|---|---|---|
| DE | 102008015249 A1 | 9/2008 |
| DE | 102007061908 A1 | 6/2009 |
| EP | 2121397 B1 | 5/2013 |
| EP | 2615003 A1 | 7/2013 |

\* cited by examiner

ELECTROPNEUMATIC PARKING BRAKE MODULE FOR UTILITY VEHICLES WITH SPRING-TYPE PARKING BRAKES

CROSS REFERENCE TO RELATED APPLICATIONS

This application is a U.S. National Phase Application under 35 U.S.C. § 371 of International Application No. PCT/EP2018/073379, filed on Aug. 30, 2018, and claims benefit to German Patent Application No. DE 10 2017 009 578.7, filed on Oct. 14, 2017. The International Application was published in German on Apr. 18, 2019 as WO 2019/072452 under PCT Article 21(2).

FIELD

The invention relates to an electropneumatic parking brake module for utility vehicles with spring-type parking brakes, with a supply port for connecting a compressed air supply, at least one spring brake actuator port for connecting at least one spring brake cylinder, a trailer control port, at which a trailer control pressure can be controlled and for connection of a trailer control valve, an inlet-outlet valve unit for controlling a spring brake pressure at the spring brake actuator port and an electropneumatic pilot control unit for controlling at least one control pressure at the inlet-outlet valve unit and for carrying out a trailer control position function.

BACKGROUND

Such electropneumatic parking brake modules, also called electropneumatic handbrake modules or parking brake modules, are used to operate so-called parking brakes, usually spring-type brakes, of a pneumatic braking system for a utility vehicle.

Spring-type brakes can be used as holding brakes or parking brakes and have a spring-loaded brake actuator which clamps the brake when unpressurized, so that the vehicle is braked accordingly in the unpressurized condition. To release the spring-type brakes, these are supplied with compressed air, so that the spring-type brakes are released against the force of the spring.

As a rule, such electropneumatic parking brake modules therefore have a supply port for connecting a compressed air supply and at least one spring brake actuator port for connecting to at least one spring brake cylinder. In this case, it is conceivable that all the spring brake cylinders of the utility vehicle are connected to a single spring brake actuator port of the electropneumatic parking brake module, in particular the towing vehicle of a towing vehicle-trailer combination. It is also possible that separate connections are provided for this purpose.

As a rule, such electropneumatic parking brake modules use a relay valve to supply the spring brake actuator port and thus the spring brake cylinder with a volume flow. Furthermore, they use a bistable valve to maintain the state of the spring brake cylinder when in the driving mode and/or when in the parked state, i.e. either an air supply state or a vent state, without having to permanently energize an electromagnetic valve.

It is important for such electropneumatic parking brake modules that the control pressure for the trailer is maintained in the parked state. This is usually achieved by means of a separate monostable or bistable electromagnetic valve.

In some cases, valves with three or more switching positions were also used in electropneumatic parking brake modules. For example, a parking brake module is known from DE 103 36 611 A1 that has a manually actuatable 4/3-way valve. This manual actuation valve can be placed in one of three switching positions by manually operating a handle. In the first switching position, a pressure is passed through to a compressed air line connected to the manual actuation valve on the output side, which then leads to a relay valve for the trailer and the brake cylinder. The output of the relay valve is connected to both the trailer control port and the spring brake actuator port.

In a second switching position of the manual actuation valve, a connection can be made from the output-side compressed air line to a vent port connected to the atmosphere. The relay valve can be vented in this position. This second switching position is used for manual venting of the spring brake actuator port for the purpose of applying the parking brake. In a third switching position, the manual actuation valve behaves neutrally, i.e. it allows a compressed air flow between the compressed air lines in both directions.

EP 2 121 397 B1 discloses a parking brake module with a 3/3-way valve, which either connects a branch line from the spring brake actuator port to the trailer control port, connects the trailer control port directly to a compressed air supply or blocks both lines from each other. This allows a trailer control position function to be performed.

In the case of a trailer control position function, a check is carried out as to whether the towing vehicle-trailer combination is also stationary based only on the applied spring-type parking brakes of the towing vehicle without additional application of the service brakes of the trailer. This is done to ensure safe holding of the towing vehicle-trailer combination even with released trailer service brakes, for example because of leakage. The parking brakes of the towing vehicle are usually to be applied when the towing vehicle-trailer combination is in a parked condition, while at the same time the service brakes of the trailer are braked by the build-up of a corresponding pressure. Since leakage often cannot be completely avoided, it may happen that the trailer service brakes are gradually released during a longer parking period. For this reason, the trailer service brakes are temporarily released during a trailer control position, while the trailer's spring-type brakes remain applied. The driver now waits a certain amount of time and checks whether the towing vehicle-trailer combination is moving. If it does not do so, the trailer control setting can be terminated and the trailer service brakes can be applied.

For this purpose, a valve is required that can decouple the spring brake actuator port from the service brakes, that is to say from the trailer control port.

Another parking brake module is known from EP 2 615 003 A1. This parking brake module is basically similar to the one known from EP 2 121 397 B1, but uses only a 3/2-way valve to connect the trailer control port alternatively to the compressed air supply or the trailer control port.

SUMMARY

In an embodiment, the present invention provides an electropneumatic parking brake module. The electropneumatic parking brake module includes a supply port configured to connect a compressed air supply, at least one spring brake actuator port configured to connect at least one spring brake cylinder, and a trailer control port configured to connect a trailer control valve and at which a trailer control pressure is configured to be controlled. The electropneumatic parking brake module further includes an inlet-outlet valve unit configured to control a spring brake pressure at the at least one spring brake actuator port, and an electropneumatic pilot control unit configured to control at least one control pressure at the inlet-outlet valve unit and configured to perform a trailer control position function. The electropneumatic pilot control unit includes a 3/3-way valve that has a first switching position, a second switching position, and a third switching position. In the first switching position, the at least one control pressure is configured to be controlled at the inlet-outlet valve unit via the 3/3-way valve. In the second switching position, the trailer control position function is configured to be carried out. In the third switching position, the inlet-outlet valve unit and the trailer control port are connected to a vent.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
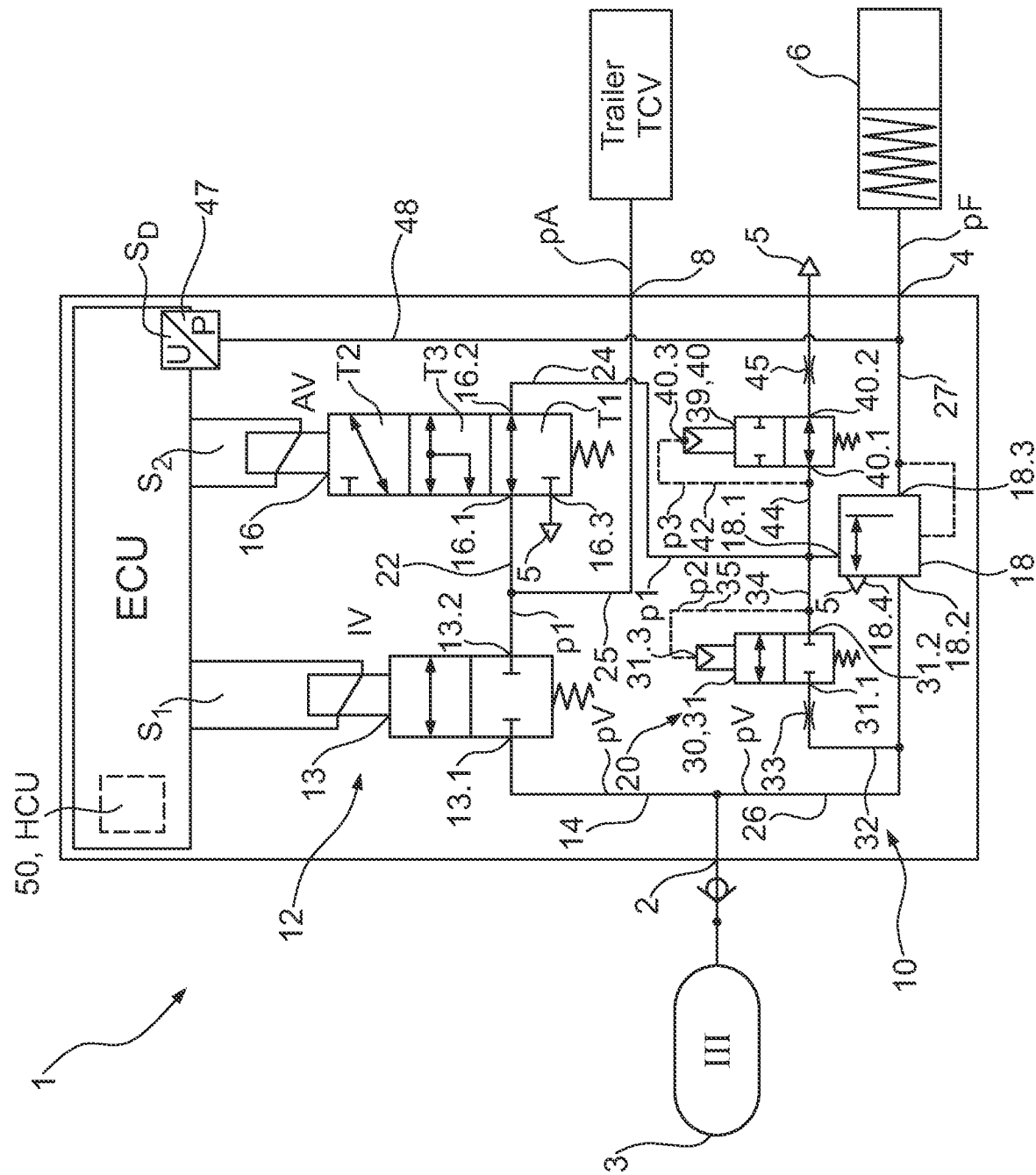
FIG. 1 shows a block diagram of an electropneumatic parking brake module.
Figure 2:
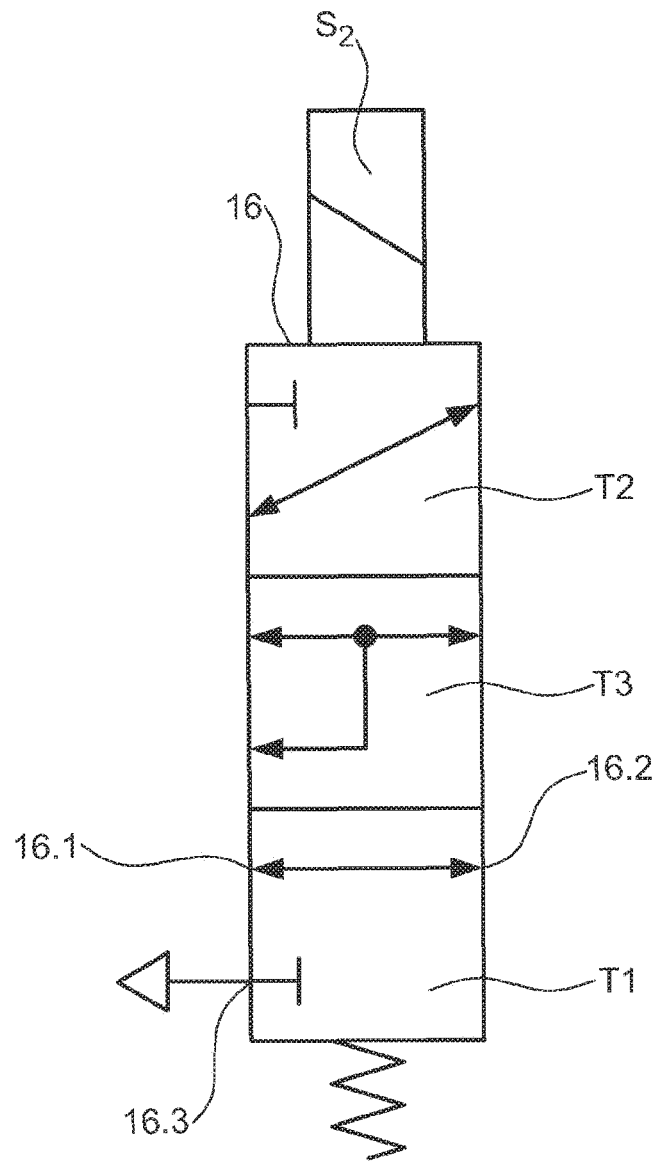
FIG. 2 shows an enlarged representation of a 3/3-way valve.

The present disclosure describes a simpler design and in particular a design in which only a single control pressure is used and at the same time a trailer control position function can be carried out.

The present disclosure describes pilot control units having a 3/3-way valve, which has a first, a second and a third switching position, wherein in the first switching position the control pressure can be output to the inlet-outlet valve unit via the 3/3-way valve, in the second switching position the trailer control position function can be carried out, and in the third switching position the inlet-outlet valve unit and the trailer control port are connected to a vent.

With this circuit, the control pressure can be provided at the inlet-outlet valve unit via the 3/3-way valve. The same control pressure can also preferably be provided at the trailer control port. This circuit allows a European trailer control system to be implemented. For this purpose, the 3/3-way valve is preferably deenergized in the first switching position. In the case of the trailer control position function, it is not the spring brake pressure or a pressure at the rear control port that is proportional thereto that is controlled, but a pressure that is independent thereof and that is capable of releasing trailer service brakes. Preferably, the pressure controlled with the trailer control position function corresponds to the pressure that is controlled at the trailer control port when the spring brake actuator port is supplied with air. It should be understood that the third switching position of the 3/3-way valve does not necessarily have to be a stable switching position. Preferably, the first and second switching positions are end positions of the 3/3-way valve, and the third switching position is provided between the first and second switching positions. It may be essentially in the form of a floating position or a central switching position.

By designing the parking brake module with the 3/3-way valve, an additional solenoid valve can be saved, so that the parking brake module can bring with it a cost advantage compared to conventional solutions.

According to a first preferred embodiment, in the first switching position of the 3/3-way valve the trailer control pressure is pneumatically dependent on the spring brake pressure and is independent of the spring brake pressure in the second switching position of the 3/3-way valve. Preferably, the trailer control pressure corresponds to the spring brake pressure or is equivalent thereto if it depends on the spring brake pressure. For this purpose, it may be provided that in the first switching position of the 3/3-way valve the trailer control port is connected to the spring brake actuator port or the trailer control port is connected to a control input of a relay valve for the spring brake actuator port. This achieves a particularly simple construction. In the second switching position, if the trailer control pressure is independent of the spring brake pressure, the trailer control position can be implemented. For this purpose, the trailer control port must then be supplied with air in the case of European trailer control, while the spring brake actuator port is vented so that the spring brake cylinders are clamped.

Furthermore, it is preferred that the 3/3-way valve has a first 3/3-way valve port that is connected or can be connected to the supply port, a second 3/3-way valve port connected to the inlet-outlet valve unit and a third 3/3-way valve port connected to the vent. Preferably, in the first switching position the first 3/3-way valve port is connected to the second 3/3-way valve port, in the second switching position the second 3/3-way valve port is connected to the third 3/3-way valve port and in the third switching position the first 3/3-way valve port is connected to the second 3/3-way valve port and the third 3/3-way valve port. In this way, it is possible to vent the spring brake actuator port in the third switching position and at the same time to vent the control input of one of the inlet-outlet valve units, preferably of a relay valve. This allows the brakes, i.e. both the towing vehicle parking brakes and the trailer service brakes, to be applied quickly.

According to a further preferred embodiment, the pilot control unit has an inlet valve, wherein the 3/3-way valve is connected to the supply port via the inlet valve. The inlet valve is preferably in the form of a 2/2-way switching valve and is deenergized in a closed switching position. The inlet valve can preferably be operated to provide a control pressure, which is used both as a control pressure for the trailer control port as well as a control pressure for the spring brake actuator port, for example as a control pressure for a relay valve upstream of the spring brake actuator port. In this way, it is possible to use only a single inlet valve, which provides a single control pressure, which is then provided by means of the 3/3-way valve as required for the spring brake actuator port, the trailer control port or both. This also allows a compact design of the electropneumatic parking brake module to be achieved in which as few valves as possible can be used.

Furthermore, it is preferred that the trailer control port is connected to the supply port via the inlet valve or another inlet valve. Preferably, the trailer control port is connected to the supply port via the inlet valve. In this case, the control pressure controlled by the inlet valve at the trailer control port can be provided directly via the inlet valve as a trailer control pressure.

Alternatively, it is also possible to provide another inlet valve for this purpose, wherein the disadvantage is that another valve is used and the installation space can thus become larger.

Preferably, the inlet valve has a first inlet valve port connected to the supply port and a second inlet valve port connected to the 3/3-way valve and the trailer control port. This means that when switching the inlet valve, the first inlet valve port is connected to both the 3/3-way valve and the trailer control port. Preferably, the second inlet valve port is connected to the first 3/3-way valve port. With the 3/3-way valve in the first switching position, the control pressure controlled by the inlet valve can be provided at the inlet-outlet valve unit via the 3/3-way valve and at the trailer control port directly from the second inlet valve port. The use of a single control pressure for controlling both the inlet-outlet valve unit and the trailer control port is particularly easy to achieve in this way.

Preferably, the inlet-outlet valve unit has a relay valve for controlling the spring brake pressure at the spring brake actuator port. A volume pressure must be controlled at the spring brake actuator port, and the relay valve is preferably used for this purpose. The inlet valve controls the control pressure at the inlet-outlet valve unit and preferably at the relay valve, which then provides the control pressure output by the inlet valve at the spring brake actuator port with increased volume.

Preferably, the relay valve has a control port connected to the 3/3-way valve, so that the first control pressure at the control port can be controlled from the 3/3-way valve.

Preferably, the relay valve also has a supply input, a working port and a vent port, wherein the supply input is connected to the supply port and the working port is connected to the spring brake actuator port.

Furthermore, it is preferably provided that the inlet-outlet valve unit has a pressure switch for maintaining an air supply state or a vented state of the spring brake actuator port. With the vehicle in the parked state, the 3/3-way valve is preferably switched so that the trailer control pressure is dependent on the spring brake pressure. This switching position is preferably also adopted with the towing vehicle-trailer combination in normal operation. This means that with the towing vehicle-trailer combination in the parked state the trailer's service brakes are applied by the electropneumatic parking brake module and the spring brake cylinders of the towing vehicle are clamped. In this case, the spring brake actuator port is vented and the trailer control port is also vented. In the normal driving mode, on the other hand, the spring brakes of the towing vehicle are released and the spring brake actuator port is supplied with air for this purpose. The trailer control port is also supplied with air to release the trailer's service brakes to coincide with release of the towing vehicle's parking brakes.

Both when travelling and in the parked state, there may be a change in the pressure at the spring brake actuator port due to leakage. Thus, it is conceivable that with the vehicle in the parked condition, due to a leakage from the supply port the spring brake actuator port is gradually supplied with air and thus the spring brake cylinders are released. An equivalent pressure would then be controlled at the trailer control port, so that the trailer service brakes would be gradually released. To prevent this, according to this embodiment the pressure switch is provided, which causes the inlet valve unit to apply air to the spring brake actuator port when the first control pressure exceeds a threshold value and causes the inlet-outlet valve unit to vent the spring brake actuator port when the first control pressure corresponds to or falls below the threshold value.

The pressure switch preferably has a first pneumatically controlled switching valve and a second pneumatically controlled switching valve. The first pneumatically controlled switching valve connects the control port of the relay valve to the supply port, and the second pneumatically controlled switching valve connects the control port of the relay valve to the vent. Both pneumatically controlled switching valves are preferably fitted with a choke. In this way, the spring brake actuator port can be permanently vented when the pressure is below the threshold value, and a volume flow can be continuously controlled when the pressure is above the threshold value. Both gradual venting and sudden venting or air application are avoided.

Furthermore, it is preferred that the electropneumatic parking brake module has an electrical control unit with an electrical connection for receiving parking brake signals and for providing corresponding switching signals at least to the control unit. The electrical connection for receiving parking brake signals may, for example, be connected to a vehicle bus or directly via wiring to a parking brake switch or a handbrake switch in the driver's cab of the vehicle.

Furthermore, it is provided that the electropneumatic parking brake module has a pressure sensor, which is provided to detect the spring brake pressure and to provide a corresponding pressure signal. The pressure sensor preferably provides the pressure signal to the electronic control unit. The electronic control unit may pass the pressure signal to a vehicle bus or the like or may process it independently. The pressure signal detected by the pressure sensor can be used to determine whether the spring brake cylinders are clamped or released.

Embodiments are now described below on the basis of the drawing. This is not necessarily intended to represent the embodiments to scale, but rather the drawing is produced in a schematized and/or slightly distorted form for the sake of explanation. With regard to additions to the lessons that can be learned directly from the drawing, reference is made to the relevant prior art. It should be taken into account that various modifications and changes concerning the shape and detail of an embodiment can be made without deviating from the general idea of the invention. The features disclosed in the description, drawing and claims may be provided both individually and in any combination. In addition, all combinations of at least two of the features disclosed in the description, drawing and/or claims fall within the scope of the invention. The general idea of the invention is not limited to the exact form or detail of the preferred embodiments that are shown and described below or limited to an object that would be limited compared to the subject-matter that is claimed in the claims. In the case of specified dimensional ranges, values within the above limits should also be disclosed as limit values and can be used as desired and can be claimed. For simplicity, the same reference characters are used below for identical or similar parts or parts with identical or similar functions.

Further advantages, features and details of the disclosure are provided in the following description of the preferred embodiments as well as on the basis of the drawings.

In the figures, an electropneumatic parking brake module 1 has a supply port 2, via which the electropneumatic parking brake module 1 can be connected to a compressed air supply 3. Furthermore, the electropneumatic parking brake module 1 has a spring brake actuator port 4 for connecting at least one spring brake cylinder 6 of a towing vehicle. Even if only a single spring brake cylinder 6 is shown in FIG. 1, it should be understood that multiple, in particular two, spring brake cylinders 6 can be connected to this port. Spring brake cylinders 6 are generally known to the person skilled in the art. They have a piston and a spring, wherein the spring clamps the spring brake cylinder 6 and thus locks the wheels of the towing vehicle. To release the spring brake cylinders 6, these must be subjected to a spring brake pressure pF in order to release the spring brake cylinders 6.

Furthermore, the electropneumatic parking brake module 1 has a trailer control port 8 to which a trailer control valve TCV can be connected. The trailer control valve TCV is used to provide a control and/or working pressure for the trailer of the towing vehicle-trailer combination to control the trailer service brakes. In certain driving or parking situations, it is preferable that trailer service brakes are braked in coincidence with the spring brake cylinders 6 of the vehicle, so that an electropneumatic parking brake module 1 can also control a trailer control pressure pA for the trailer control valve TCV.

In order to supply air to or to vent the spring brake actuator port 4, the electropneumatic parking brake module 1 according to this exemplary embodiment (FIG. 1) has an inlet-outlet valve unit 10. The inlet-outlet valve unit 10 in this exemplary embodiment is controlled purely pneumatically and is used to control the spring brake pressure pF as a function of a first control pressure p1. However, there may also be embodiments that have electropneumatic inlet-outlet valve units.

The first control pressure p1 is provided by a pilot control unit 12. For the control of the first control pressure p1, the input unit 12 has an inlet valve 13 that is connected via a first pneumatic line 14 to the supply port 2 and that receives supply pressure pV. More precisely, the inlet valve 13 is in the form of a 2/2-way switching valve and has a first inlet valve port 13.1 and a second inlet valve port 13.2, wherein the first inlet valve port 13.1 is connected to the first pneumatic line 14. The inlet valve 13 has a first switching position shown in FIG. 1 and a second switching position that is not shown in FIG. 1. The first switching position is a closed switching position and the second switching position is an open switching position in which the first inlet valve port 13.1 is connected to the second inlet valve port 13.2. The inlet valve 13 is deenergized in the first switching position. It can be switched from the first switching position to the second switching position by a first switching signal S1 that is provided by an electronic control unit ECU. By switching the inlet valve 13, the first control pressure p1 can be controlled at the second inlet valve port 13.2.

The first control pressure p1 is then provided via a second pneumatic line 22 to a 3/3-way switching valve 16. The 3/3-way switching valve 16 then provides the first control pressure p1 to the inlet-outlet valve unit 10 via a third pneumatic line 24 depending on the switching position. From the second pneumatic line 22, a trailer control line 25 branches off that runs directly to the trailer control port 8 and thus provides the first control pressure p1 as a trailer control pressure pA at the trailer control port 8.

The 3/3-way valve 16 is used to perform a trailer control position function. In the case of the trailer control position function, the electropneumatic parking brake module 1 is intended to control a trailer control pressure pA that does not correspond to the spring brake pressure pF, in order to leave the trailer service brakes released while the spring brake cylinders 6 of the towing vehicle are clamped. For this purpose, the 3/3-way valve 16 has a first 3/3-way valve port 16.1, a second 3/3-way valve port 16.2 and a third 3/3-way valve port 16.3. The first 3/3-way valve port 16.1 is connected to the second pneumatic line 22 and thus to both the inlet valve 13 and the trailer control port 8. The second 3/3-way valve port 16.2 is connected to the third pneumatic line 24 in order to provide the first control pressure p1 to the inlet-outlet valve unit 10. The third 3/3-way valve port 16.3 is connected to a vent.

The 3/3-way valve 16 has a total of three switching positions, a first switching position T1, a second switching position T2 and a third switching position T3. The switching positions do not all have to be stable, so it is preferred, for example, that the third switching position T3 is a floating position. In the first switching position T1, the first 3/3-way valve port 16.1 is connected to the second 3/3-way valve port 16.2. In the second switching position T2, the second 3/3-way valve port 16.2 is connected to the third 3/3-way valve port 16.3, so that the third pneumatic line 24 is vented. In the third switching position T3, all three 3/3-way valve ports 16.1, 16.2, 16.3 are connected to each other, so that both the third pneumatic line 24 and the second pneumatic line 22 and thus the trailer control line 25 are connected to the vent 5. The 3/3-way valve 16 is preferably deenergized in the first switching position T1. By means of a second switching signal S2, the 3/3-way valve 16 can be switched from the first switching position T1 to the second switching position T2 or the third switching position T3. In the first switching position T1, the first pressure p1 is controlled both in the trailer control line 25 and via the opened 3/3-way valve 16 in the third pneumatic line. Even when closing the inlet valve 13, both the trailer control pressure pA and the spring brake pressure pF are dependent, since the third pneumatic line 24 is connected via the 3/3-way valve 16 to the trailer control line 25. The first control pressure p1 is therefore applied to both the inlet-outlet valve unit 10 and the trailer control port 8.

In the second switching position T2 of the 3/3-way valve 16, on the other hand, the third pneumatic line 24 can be vented, so that the spring brake actuator port 4 can also be vented. If the spring brake actuator port 4 is vented, the spring brake cylinders 6 are clamped. However, a connection is not established between the trailer control line 25 and the third pneumatic line 24, and the trailer control pressure pA can be controlled via the inlet valve 13 regardless of the pressure of the spring brake actuator port 4. The first 3/3-way valve port 16.1 is shut off, so that the pressure controlled by the inlet valve 13 is introduced exclusively into the trailer control line 25. In this second switching position T2 of the 3/3-way valve 16, a trailer control pressure pA can also be output, even if the spring brake actuator port 4 is being vented. In this way, a trailer control position can be implemented.

The third switching position T3 is used to quickly vent both the spring brake actuator port 4 and the trailer control port 8 in order to clamp both the spring brake cylinders 6 and the trailer service brakes.

The inlet-outlet valve unit 10 is initially connected to the supply port 2 via a fourth pneumatic line 26, so that the supply pressure pV is controlled in the fourth pneumatic line 26. The inlet-outlet valve unit 10 also has a relay valve 18, which has a control port 18.1, a supply input 18.2, a working port 18.3 and a vent port 18.4. The control port 18.1 is connected to the third pneumatic line 24 and receives the first control pressure p1. The vent port 18.4 is connected to the vent 5 or a vent, and the supply input 18.2 is connected to the fourth pneumatic line 26. The working port 18.3 is connected to a spring brake pressure line 27, which in turn is connected to the spring brake actuator port 4. The spring brake pressure pF is controlled in the spring brake pressure line 27. The relay valve 18 is used to receive the first control pressure p1 and to control the spring brake pressure pF in the spring brake pressure line 27 in an increased volume.

For maintaining an air supply state or a vented state of the spring brake actuator port 4, the inlet-outlet valve unit 10 has a pressure switch 20. The pressure switch 20 has a bypass valve 30, which in this exemplary embodiment is in the form of a 2/2-way bypass valve 31. The 2/2-way bypass valve 31 has a first bypass valve port 31.1 and a second bypass valve port 31.2. Furthermore, the bypass valve 30, here in the form of a 2/2-way bypass valve 31, has a pneumatic bypass valve control input 31.3. The first bypass valve port 31.1 is connected to the fifth pneumatic line 32, which branches off from the fourth pneumatic line 26, so that the supply pressure pV is applied to the first bypass valve port 31.1. In the fifth pneumatic line 32, however, a first choke 33 is installed, which could also be provided in the bypass valve 30. In this respect, the supply pressure pV is provided choked at the first bypass valve port 31.1. The bypass valve 30 has a first switching position that is shown in FIG. 1 and a second switching position that is not shown in FIG. 1. In the first switching position shown in FIG. 1, the bypass valve 30 is closed. In the second switching position that is not shown in FIG. 1 the bypass valve 30 is open, and the choked supply pressure is provided at the second bypass valve port 31.2. This is connected via a sixth pneumatic line 34 to the control port 18.1 of the relay valve. The bypass valve 30 is controlled by a second control pressure p2, which is fed to the bypass valve control input 31.3 in a bypass valve control line 35. The bypass valve control line 35 branches off from the sixth pneumatic line 34, but could also branch off from the third pneumatic line. It is important that in the bypass valve control line 35 the pressure that is applied to the control port 18.1 of the relay valve 18 is controlled. This means that as soon as the first control pressure p1, which is controlled at the relay valve 18, exceeds a threshold value, the bypass valve 30 is switched into the open switching position that is not shown in FIG. 1, so that in addition to the first control pressure p1 the choked supply pressure pV is provided at the control port 18.1 of the relay valve 18 in order to maintain the applied air condition of the spring brake cylinder 6, even if the pressure output by the inlet valve 13 and the 3/3-way valve 16 should decrease. The bypass valve 30 adjusts the pressure accordingly to avoid creeping venting of the spring brake cylinder 6.

In order to maintain the venting state, the pressure switch 20 has an outlet valve 39 for venting the pressure switch 20 and for venting the control port 18.1 of the relay valve 18. In this exemplary embodiment (FIG. 1), the outlet valve 39 is in the form of a 2/2-way outlet valve 40 and has a first outlet valve port 40.1 and a second outlet valve port 40.2. In addition, the outlet valve 39 has an outlet valve control input 40.3, at which an outlet valve control pressure p3 can be controlled. The outlet valve control input 40.3 is connected to an outlet valve control line 42, which is provided to control a pressure equivalent to the first control pressure p1 as the outlet valve control pressure p3 at the outlet valve control input 40.3. For this purpose, the outlet valve control line 42 branches off from the third pneumatic line 24 or a seventh pneumatic line 44, which can also be called an outlet line. The second outlet valve port 40.2 is connected to a vent 5. The seventh pneumatic line 44 has a second choke 45, so that the venting of the control port 18.1 of the relay valve 18 is choked. The second choke 45 can also be provided inside the outlet valve 39. The outlet valve 39 is switched inversely in relation to the bypass valve 30. The outlet valve is open when unpressurized, i.e. as soon as the third control pressure p3 falls below a predetermined threshold, the outlet valve 39 switches to the first switching position shown in FIG. 1. If, on the other hand, the third control pressure p3 exceeds the predetermined threshold value, the outlet valve 39 switches to the second switching position, which is not shown in FIG. 1, in which it is closed.

That is, as soon as the first control pressure p1 falls below a certain threshold value, the bypass valve closes 30, while at the same time the outlet valve opens 39. The control port 18.1 of the relay valve 18 is then permanently connected to the vent 5 via the second choke 45, so that the vented state continues to be maintained.

Furthermore, the electropneumatic parking brake module 1 has a pressure sensor 47, which is provided to detect the spring brake pressure pF. For this purpose, the pressure sensor 47 has a measuring line 48, which branches off from the spring brake pressure line 27. The pressure sensor 47 provides a pressure signal SD to the electronic control unit ECU, so that based on the received pressure signal SD the electronic control unit ECU can determine whether the spring brake cylinders 6 are clamped or released.

Furthermore, the electropneumatic parking brake module 1, or more precisely the electronic control unit ECU, has an electrical connection 50, via which parking brake signals HCU can be provided by a parking brake switch in the vehicle's cab. Depending on the received parking brake signals HCU, the electronic control unit determines corresponding first and second switching signals S1, S2 and provides them to the inlet valve 13 and the 3/3-way valve 16 as required.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electropneumatic parking brake module, comprising:
   a supply port configured to connect a compressed air supply;
   at least one spring brake actuator port configured to connect at least one spring brake cylinder;

a trailer control port configured to connect a trailer control valve and at which a trailer control pressure is configured to be controlled;

an inlet-outlet valve unit configured to control a spring brake pressure at the at least one spring brake actuator port, and an electropneumatic pilot control unit configured to control at least one control pressure at the inlet-outlet valve unit and configured to perform a trailer control position function, the electropneumatic pilot control unit including a 3/3-way valve that has a first switching position, a second switching position, and a third switching position, wherein, in the first switching position, the at least one control pressure is configured to be controlled at the inlet-outlet valve unit via the 3/3-way valve, wherein, in the second switching position, the trailer control position function is configured to be carried out, and wherein, in the third switching position, the inlet-outlet valve unit and the trailer control port are connected to a vent.

2. The electropneumatic parking brake module as claimed in claim 1, wherein, in the first switching position, the trailer control pressure is pneumatically dependent on the spring brake pressure, and wherein, in the second switching position, the trailer control pressure is independent of the spring brake pressure.

3. The electropneumatic parking brake module according to claim 1, wherein the 3/3-way valve has a first 3/3-way valve port connected or connectable to the supply port, a second 3/3-way valve port connected to the inlet-outlet valve unit, and a third 3/3-way valve port connected to the vent.

4. The electropneumatic parking brake module as claimed in claim 3, wherein, in the first switching position, the first 3/3-way valve port is connected to the second 3/3-way valve port, wherein, in the second switching position, the second 3/3-way valve port is connected to the third 3/3-way valve port, and wherein, in the third switching position, the first 3/3-way valve port is connected to the second 3/3-way valve port and the third 3/3-way valve port.

5. The electropneumatic parking brake module according to claim 1, wherein the pilot control unit has an inlet valve, and wherein the 3/3-way valve is connected to the supply port via the inlet valve.

6. The electropneumatic parking brake module according to claim 5, wherein the trailer control port is connected to the supply port via the inlet valve or another inlet valve.

7. The electropneumatic parking brake module as claimed in claim 5, wherein the inlet valve has a first inlet valve port connected to the supply port and a second inlet valve port connected to the 3/3-way valve and the trailer control port.

8. The electropneumatic parking brake module as claimed in claim 3, wherein a second inlet valve port is connected to the first 3/3-way valve port.

9. The electropneumatic parking brake module according to claim 1, wherein the inlet-outlet valve unit has a relay valve configured to control the spring brake pressure at the spring brake actuator port.

10. The electropneumatic parking brake module as claimed in claim 9, wherein the relay valve has a control port that is connected to the 3/3-way valve, so that the first control pressure at the control port is configured to be controlled from the 3/3-way valve.

11. The electropneumatic parking brake module as claimed in claim 10, wherein the relay valve has a supply input, a working connection, and a vent connection, wherein the supply input is connected to the supply port and the working connection is connected to the spring brake actuator port.

12. The electropneumatic parking brake module as claimed in claim 1, wherein the inlet-outlet valve unit has a pressure switch configured to maintain an air supply state or a vented state of the spring brake actuator port.

13. The electropneumatic parking brake module as claimed in claim 12, wherein the pressure switch is configured to cause the inlet-outlet valve unit to apply air to the spring brake actuator port when the first control pressure exceeds a threshold value, and to cause the inlet-outlet valve unit to vent the spring brake actuator port when the first control pressure corresponds to the threshold value or falls below the threshold value.

14. The electropneumatic parking brake module as claimed in claim 1, further comprising an electric control unit with an electrical connection configured to receive parking brake signals and to provide switching signals to the pilot control unit.

15. The electropneumatic parking brake module as claimed in claim 1, further comprising a pressure sensor configured to detect the spring brake pressure and to provide a corresponding signal.

* * * * *